(12) United States Patent  (10) Patent No.: US 7,090,280 B2
Willey                     (45) Date of Patent:     Aug. 15, 2006

(54) MOUNTING SYSTEM FOR ACCESSORIES

(76) Inventor: Barry A. Willey, 727 Ela Rd., Inverness, IL (US) 60067

( * ) Notice: Subject to any disclaimer, the term of this patent is extended or adjusted under 35 U.S.C. 154(b) by 0 days.

(21) Appl. No.: 10/971,292

(22) Filed: Oct. 22, 2004

(65) Prior Publication Data
US 2006/0087143 A1 Apr. 27, 2006

(51) Int. Cl.
B62J 17/00 (2006.01)
(52) U.S. Cl. ..................... 296/78.1; 224/413
(58) Field of Classification Search ................ 296/78.1
See application file for complete search history.

(56) References Cited

U.S. PATENT DOCUMENTS

| 4,082,345 | A |   | 4/1978  | Willey |             |
|-----------|---|---|---------|--------|-------------|
| 4,168,098 | A |   | 9/1979  | Willey |             |
| 4,379,584 | A |   | 4/1983  | Willey |             |
| 4,489,973 | A |   | 12/1984 | Willey |             |
| 5,658,035 | A | * | 8/1997  | Armstrong | 296/78.1 |
| 5,732,965 | A | * | 3/1998  | Willey | 296/78.1    |
| 5,788,313 | A |   | 8/1998  | Willey |             |
| 5,845,955 | A | * | 12/1998 | Willey | 296/78.1    |
| 6,163,989 | A | * | 12/2000 | Kaczmarski et al. | 37/468 |
| 6,196,614 | B1 | * | 3/2001 | Willey | 296/78.1    |
| 6,234,554 | B1 |   | 5/2001 | Willey |             |
| 6,254,166 | B1 | * | 7/2001 | Willey | 296/78.1    |
| 6,484,914 | B1 | * | 11/2002 | Willey | 224/413    |
| 6,543,831 | B1 | * | 4/2003 | Takemura et al. | 296/78.1 |
| 6,736,441 | B1 | * | 5/2004 | Barber et al. | 296/78.1 |
| 6,808,219 | B1 | * | 10/2004 | Barber et al. | 296/78.1 |
| 6,877,788 | B1 | * | 4/2005 | Graham | 296/78.1   |
| 6,905,160 | B1 | * | 6/2005 | Yoshida et al. | 296/78.1 |
| 6,922,926 | B1 | * | 8/2005 | Miller et al. | 37/468 |
| 6,974,175 | B1 | * | 12/2005 | Willey | 296/78.1   |
| 2002/0189877 | A1 | * | 12/2002 | Yagisawa et al. | 180/219 |
| 2003/0052031 | A1 | * | 3/2003 | Poore | 206/448      |
| 2003/0062740 | A1 | * | 4/2003 | Takemura et al. | 296/78.1 |
| 2003/0218109 | A1 | * | 11/2003 | Farnham | 248/205.1 |
| 2005/0140162 | A1 | * | 6/2005 | Yamasaki | 296/78.1   |
| 2006/0002120 | A1 | * | 1/2006 | Grigg et al. | 362/475 |

* cited by examiner

Primary Examiner—Kiran B. Patel
(74) Attorney, Agent, or Firm—Vedder, Price, Kaufman & Kammholz

(57) ABSTRACT

A readily removable accessory for a motorcycle or the like. The cycle has two pairs of docking points for the accessory, which is preferably a windshield and includes a pair of brackets with a pair of latching claws. Each bracket contains partial openings which are closed off partially by the claws, as well as a pair of openings in brackets to engage the other of the docking points for another part of the accessory. The windshield or other accessory may be affixed and removed from the motorcycle merely by pushing it on or pulling it off, without touching the latching claws.

17 Claims, 4 Drawing Sheets

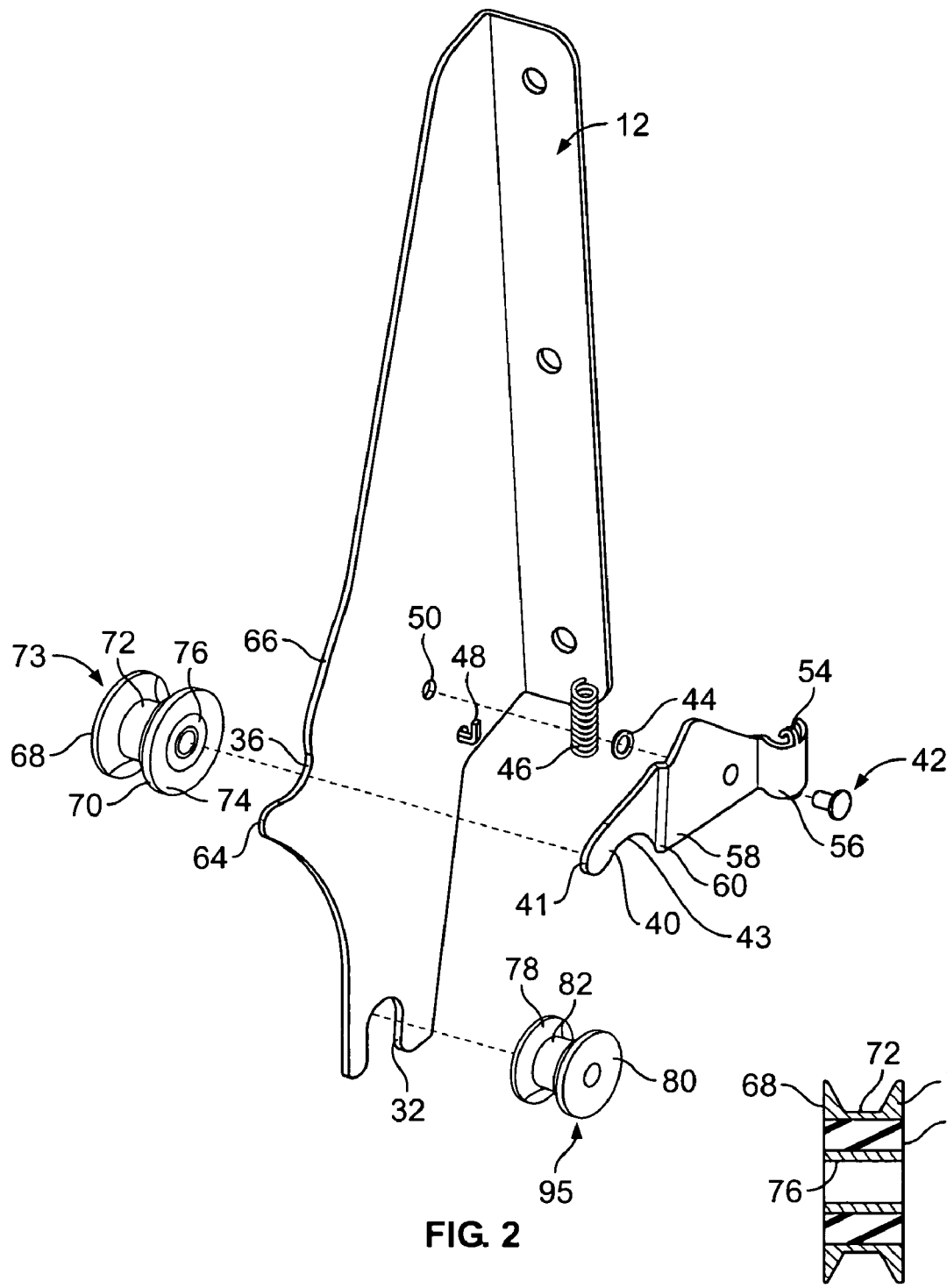
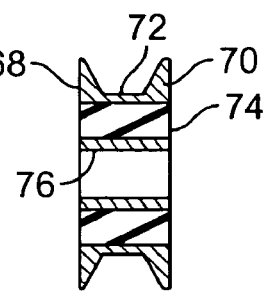
FIG. 2
FIG. 3

MOUNTING SYSTEM FOR ACCESSORIES

BACKGROUND OF THE INVENTION

The present invention relates generally to motorcycle accessories and more particularly to a novel mounting system for windshields and other accessories. The invention particularly relates to a novel mounting system which provides maximum simplicity, but also enables one to mount and dismount motorcycle windshields and other accessories from the cycle with ease and precision.

Although there are many different mounting systems for motorcycle windshields and the like, it would be particularly advantageous to provide such a system wherein the shield may be reliably attached to and removed from the motorcycle in a matter of seconds. This would be particularly true wherein the mounting system could comprise four docking points permanently affixed to the cycle, but would not leave unsightly or bulky fastening means on the cycle when it is desired to use the cycle without the shield or other accessory.

When the time comes to mount or affix the shield or other accessory, this can be done in a few seconds by a person having almost no mechanical skill. For example, it would be highly desirable to provide an accessory for mounting windshields or other accessories, wherein the docking points could be affixed to the motorcycle and remain there permanently, while the shield itself and the two brackets for mounting it could be removed and stored as a unit without further disassembly. Particularly, it would be desirable if there were such a system wherein the docking points used to mount the shield could be affixed to the motorcycle and thereafter be allowed to remain there without distracting from the appearance or function thereof, and without presenting any ungainly elements or the like such as protruding screws, studs, brackets or braces. It would also be advantageous if a simple mounting system could be placed relatively permanently on the cycle which would enable the shield to be mounted by placing the lower portion on a pivot point and thereafter merely snapping it into place by a backward (in relation to the cycle) motion into a secured position.

It would also be desirable to make a shield which would be able to be removed by a forwardly acting force, such as from the force of a rider being thrown forward in the event of an accident, whereby the shield would be detached rather than remaining in place and injuring the rider.

It would also be advantageous to provide docking points that could be fastened to or form a part of the front forks, the triple clamps, or the front fork covers themselves.

Accordingly, it is an object of the present invention to provide an improved mounting system for a windshield or the like.

Another object is to provide a unique mounting system wherein the mounting bracket on the shield includes one upper or lower surface that is relatively smooth but curvilinear and the other with an opening or notch in an oppositely directed latching claw which is automatically raised or lowered to facilitate ready installation and latching without touching or manipulating the claw.

Another object is to provide a novel flanged mounting member with a center trough, and preferably having a urethane elastomer or other somewhat flexible center section, including inclined spokes or a garter spring and further optionally having a thin, hollow innermost sleeve, making a unique composite mounting member capable of allowing a limited amount of radial deflection as it is being installed and thereafter absorbing shock and/or slight errors in alignment or dimensional variation.

A further object is to provide a mounting system for other accessories which would use the same or similar arrangement of latching members for mounting and removing saddlebags or other accessories.

A still further object of the invention is to provide a simplified system of mounting and dismounting the windshield or other desired accessory.

Another object is to provide a mounting system that does not require extreme precision in locating the docking points on the cycle.

A still further object is to provide a mounting system having a latch or claw on each bracket without affecting the simplicity of operation.

A still further object is to provide a mounting system that is virtually foolproof in operation.

Yet another object is to provide a system which permits ease of installation and removal as well.

These and other objects of the invention are achieved in practice by providing a pair of flanged members, preferably such as wheels, spools or rollers, one of which may remain fixed, and optionally may be rotatable, and other which is preferably not only rotatable but is also preferably able to undergo slight radial deformation or deflection under an applied load, and thereafter to cooperate with a bracket having one fixed edge and a movable latching claw with strong biasing means urging the claw to a closed position, and which may then be installed or removed readily without manipulating the latching claw in any way.

The manner in which these and other objects and advantages are achieved in practice will become more apparent when considered in connection with the following description of the preferred embodiments of the invention and shown in the accompanying drawings, wherein like reference numbers indicate corresponding parts throughout.

BRIEF DESCRIPTION OF THE DRAWINGS

FIG. 2 is an exploded isometric view showing the latching claw, the spring and other portions of the claw mechanism of FIG. 1, and showing the parts exploded from the left hand side of the apparatus;

FIG. 3 is an enlarged vertical sectional view of a wheel having a stiff but flexible portion lying radially inside the flanges and trough of the wheel;

DESCRIPTION OF THE PREFERRED EMBODIMENTS OF THE INVENTION

While the invention may be practicing several different ways, and there will be room for modifications or changes to be made by those skilled in the art, a brief description will be made of at least two preferred embodiments of the invention.

Figure 1:
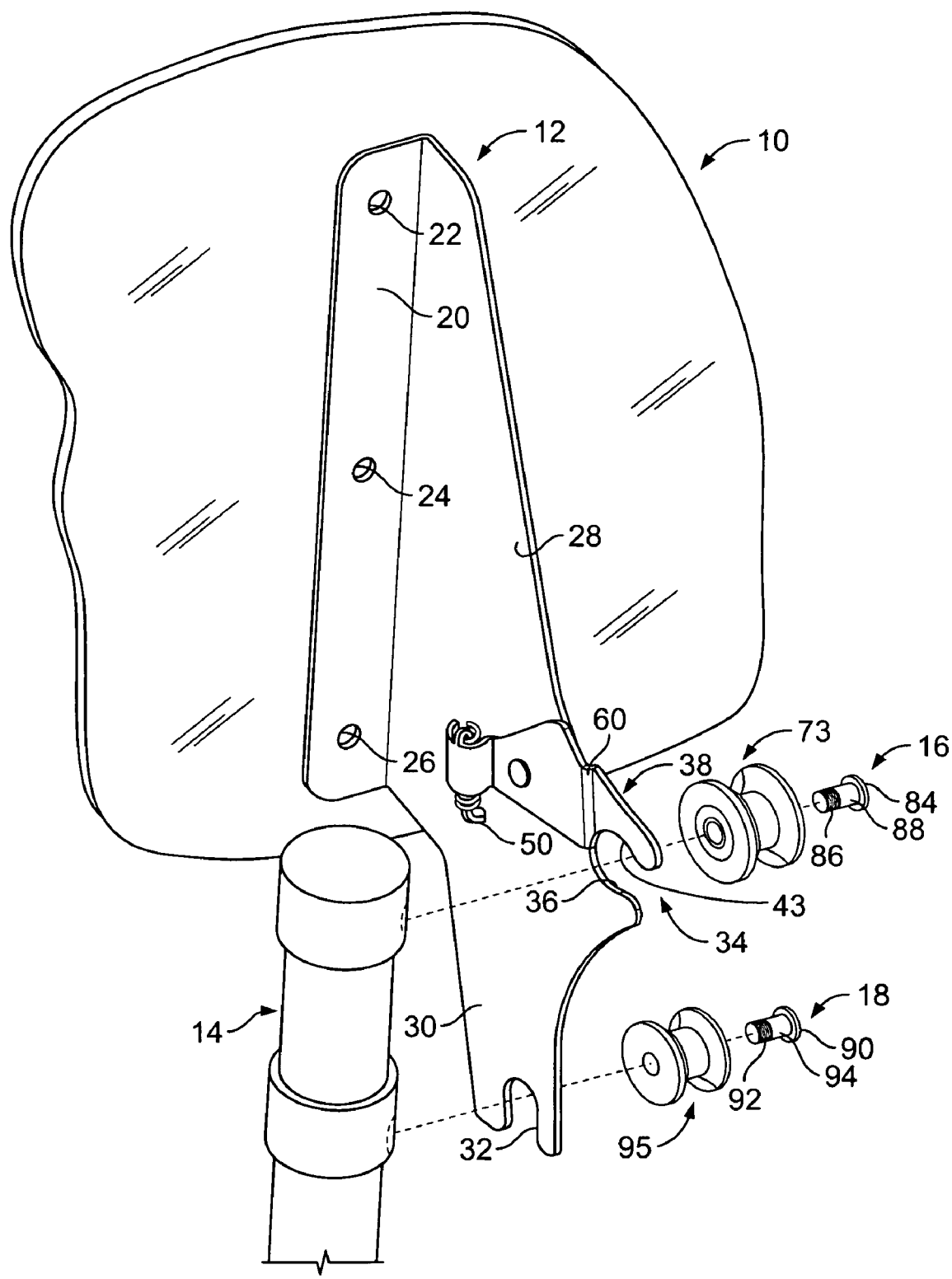
FIG. 1 is an exploded perspective view showing a portion of a windshield, a bracket assembly including a downwardly acting latching claw, and a portion of the fork leg to which it is to be attached, and showing the manner in which the bracket assembly is affixed to the fork leg.
Figure 4:
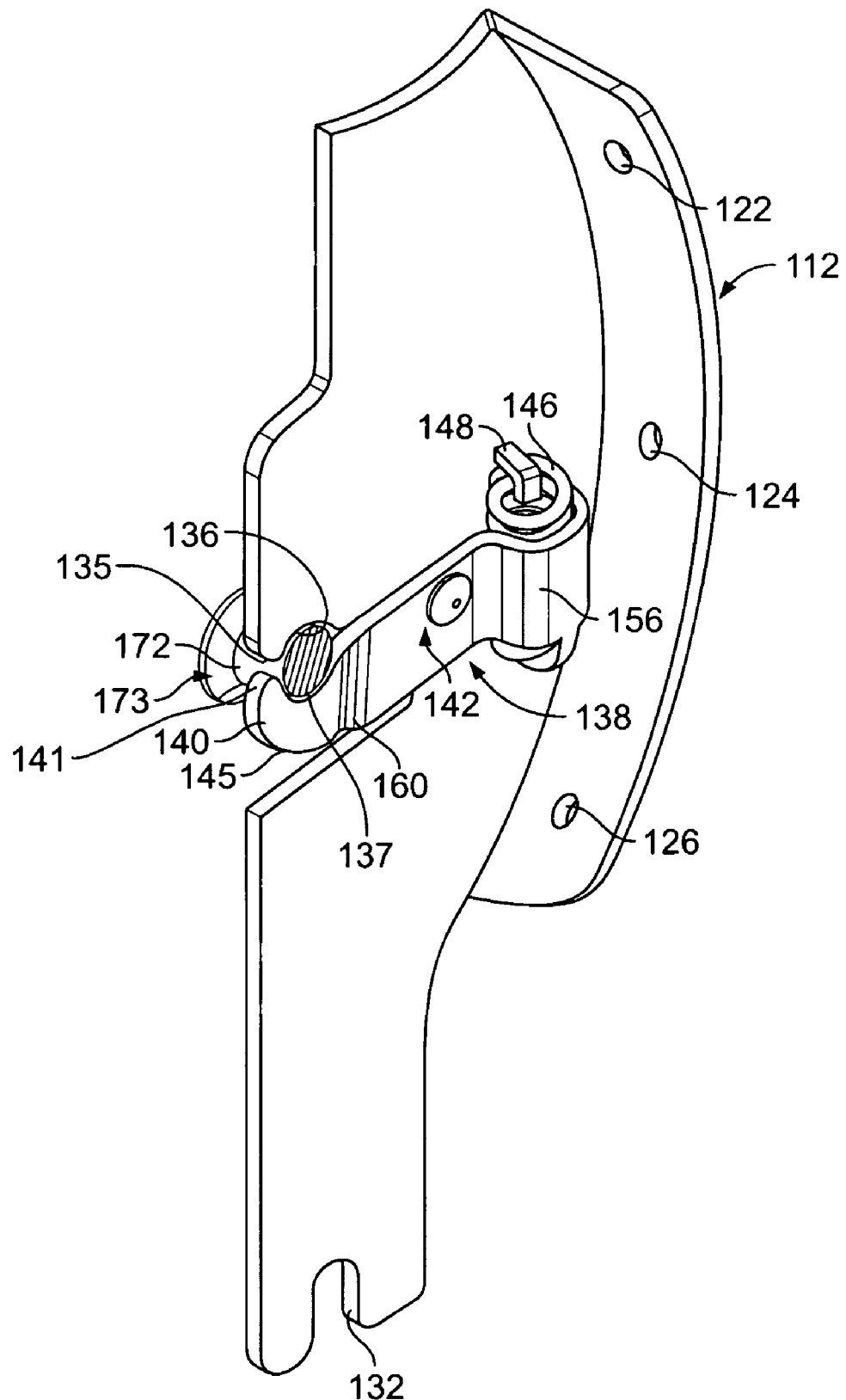
FIG. 4 is a perspective view, with a portion broken away, of another form of bracket assembly of the invention, showing a portion of the latching claw beneath the spool or wheel.
Figure 5:
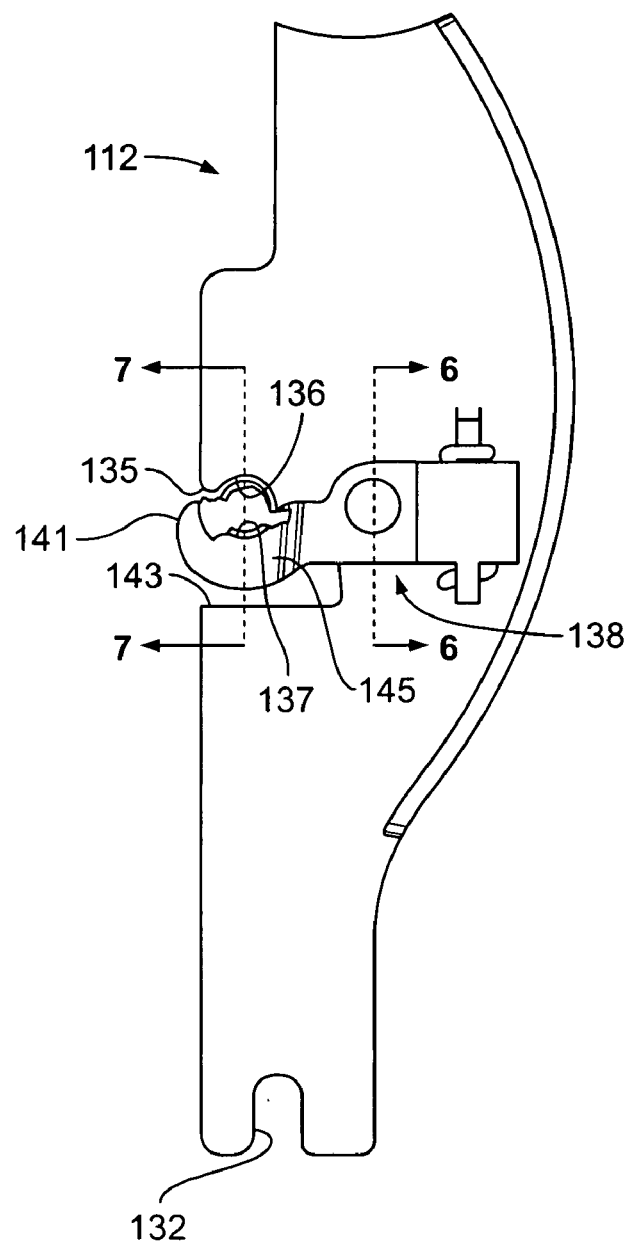
FIG. 5 is a side elevational view, with portions broken away, of the apparatus of FIG. 4.

Referring now to the drawings in greater detail, there is shown in FIG. 1 a partial windshield panel generally designated 10 and shown to be affixed by a mounting bracket generally designated 12 to the fork tubes of a motorcycle or the like generally designated 14. One fork tube 14 is only shown somewhat diagrammatically, it being understood that it may in turn be covered by a fork tube cover of some sort to which the bracket 12 would be affixed as described herein. The mounting bracket 12 is affixed by a pair of fastener assemblies generally designated 16, 18 to the forks 14. The fastener assemblies include wheels or spools, which will be described in detail later.

It will be understood that the entire windshield 10 is actually affixed by a pair of brackets (only one shown) to a pair of fork tubes (only one shown). In this instance, the bracket 12 is shown to be affixed to the right hand portion of the cycle. Referring now to the bracket generally designated 12, it is shown to include a mounting flange 20 having a plurality of openings 22, 24, 26 therein for affixing it to the windshield. The remainder of the bracket 12 comprises an upper portion 28 which is angularly related to the flange 20 and which also includes a lower portion 30 having a lowermost opening in the form of a slot 32 therein. A larger, upper slot generally designated 34 is shown, it being understood that this slot has a portion which is generally semi-circular in form.

An important feature of the upper slot 34 and its associated latching claw assembly generally designated 38 is their ability to at least partially close off the opening 34. The latching claw assembly generally designated 38 preferably includes a contoured claw member 40 (FIG. 2), a rivet generally designated 42, a washer 44, a coil spring 46, and a spring perch 48 stamped out of the bracket 12. An opening 50 is formed in the upper portion 28 of the bracket 12 to receive the shank 43 of the rivet 42.

The claw assembly 38 also includes a retainer or holder 54 for the upper portion of the coil spring 46, and a partially cylindrical formation 56 for housing the body of the spring 46. The claw assembly 38 also includes a principal body portion 58, an offsetting surface 60 and the contoured claw itself 40 which will be discussed later. In use, the spring 46 rests on the spring perch 48 and is entrapped in the housing 56 by means of the retainer 54. In this arrangement, the claw 38 may be moved upwardly against the spring force as the spring is compressed on its perch 48.

The upper opening 34 in the bracket 12 is shown to include a number of additional features including an inclined entry surface portion 64, a curvilinear retention surface 36, and a further upwardly extending exterior surface 66 that extends to the top of the bracket 12.

The wheel or spool generally designated 73 is shown in FIG. 3 to include a pair of flanges 68, 70 lying axially to either side of a trough 72 which accommodates the curvilinear retention surface 36. The spool 73 optionally includes a radially inner, elastomeric portion 74, and in some embodiments, a sleeve 76 lying radially inwardly of the elastomeric element 74. The lower wheel generally designated 95, also includes first and second axial flanges 78, 80 and a trough portion 82. The trough 82 is sized so as to fit snugly within the slot 32 or other opening at or near the bottom of the bracket 12 in this application. The wheel 95 is the preferred form of element for mating with the slot 32, but any form of retainer will suffice for this purpose.

The action of the latching claw 38 in snugly engaging the trough 72 of the wheel 73 to secure the bracket in place is accomplished through the action of the coil spring 46 acting on the latching claw 38. The rest position of the latching claw 38 is the position shown in FIG. 1. The rivet 42 holds the body 58 of the latching claw firmly in position adjacent the bracket 12. The washer 48 (FIG. 2) is preferably made from a lubricous material which enables the claw 58 to move freely up and down, subject to spring forces. The spring 46 biases the latching claw downwardly, into the position of FIG. 1, but permits it to rise up over the spool or wheel 73 when the windshield 10 is urged towards the rear of its travel during mounting.

Thus, the lower slot is first engaged over a bottom bracket holder such as the wheel or spool 95. Thereafter, the windshield, and accordingly the brackets 12, are moved backwardly and against the wheel 73 which is held in position by means of the fasteners 16. The elastomeric portion 74 of the wheel 73 helps the wheel 73 to ride over the inclined entry surface 64 of the bracket 12 and snap into place in the retention surface 36, with the latching claw 38 grasping the wheel 73 as the wheel 73 rides over the transition surface 40 and into the curvilinear retention surface 43.

Referring now to the attachment of the spools or wheels 73, 95, the fasteners 16 each include a headed portion 84, a threaded shank portion 86 and intermediate cylindrical portion 88. The threaded portion 86 extends into the forks or fork covers 14 as shown, and this positions the wheel 74 adjacent the fork tube or fork tube cover.

In the same manner, each fastener 18 includes a headed portion 90, a threaded shank portion 92 and an intermediate portion 94 which is free from threads or the like. This fastener is intended to secure the lower wheel generally designated 95 to the fork tube generally designated 14. The intermediate portions 88, 94 serve to allow the wheels 73, 95 to turn freely even when the fasteners 16, 18 are tightened down securely.

Referring now to the operation of the device, it is assumed that the windshield assembly 10 is intended to be latched in position of use on the motorcycle. The user stands in front of the motorcycle and grasps the shield 10 at either side adjacent the brackets 12. The user then places the lower slots 32 over the wheels 95. The next step is to rotate the shield 10 slightly as it is moved toward the rear of the motorcycle. While doing this, the upper wheel 73 slides over the inclined entry surface 64 and into the curvilinear retention surface 36, while the upper wheel 72 rides into this position by displacing the claw 38 first upward over the transition surface 41 and then allowing the claw 40 to achieve a lower position with the retention surface 43 snugly overlying the wheel 73.

The trough 72 of the wheel 73 first serves to raise the latching claw over the trough until the wheel is registered with and is seated between the claw and the curvilinear retention surface 36. This is met with a comparatively strong resistance, thus advising the user that the shield has snapped in place. When the claw 40 rides up and then over the trough 72, the claw 40 compresses the spring 46 as the claw 40 rotates about the pivot point formed by the rivet 42. When released, the coil spring 46 pushes downwardly on the latching claw 40, in response to spring pressure. The claw then retains its snugly held position against the trough of the wheel 73 and with both retention surfaces 43, 36 registering with the wheel 73.

The shield is then retained in place, preferably with about 30 to 40 pound retaining force developed by the claw and the contours of the bracket and claw. Of course, in use, the shield will not become detached because it is solidly pressed in place, and during riding, there is little or no forward force acting on the shield. The elastomeric center section 74 of the wheel 73 takes up some or all of the dimensional variations in the assembly. To release the shield, the opposite procedure is followed. Only 30 to 40 pounds of force in the reverse direction are needed. To remove the shield, the latching claw moves itself temporarily upwardly against the force of the spring 46, because of the contour of the claw and the various surfaces. When the claw is released, and the shield is pivoted forward, it then may be lifted slightly to free the wheel 95 from the slot 32, and the shield may be stored or otherwise dealt with.

Referring now to FIGS. 4–7, another embodiment of the shield assembly 10 is shown. Thus, referring to FIG. 4, a bracket 112 is shown which includes fastening openings 122, 124 and 126 on the bracket 112. The main difference between this embodiment and the embodiment of FIGS. 1 and 2 is that, in FIG. 4, the latching claw generally designated 138 acts upwardly and there is a transition surface 141 and a curvilinear retention surface 137 on the top of the claw 138.

In this embodiment, the spring 146, the spring perch 148, and the housing 156 are the same except that the spring is to be compressed in an upward direction rather than a downward direction. The rivet 142, is the same as in the other embodiment. The lower slot or other opening 132 is the same as its counterpart in FIGS. 1 and 2.

The inclined entry surface 135 and curvilinear retention surface 136 engage one trough surface 172 of the spool. In this instance, a somewhat enlarged opening, including a relatively straight line formation 143 makes up the overall opening in the bracket 112. This portion of the latching mechanism is a straight line 143 and affords a larger entrance for the offset portion 145 of the claw 138, which must have clearance for its limited movement.

Figure 6:
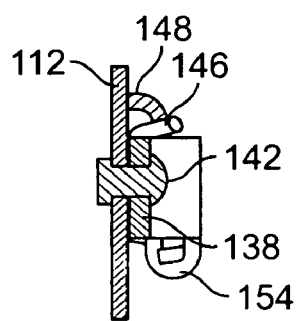
FIG. 6 is a vertical sectional view, taken along lines 6—6 of FIG. 5.
Figure 7:
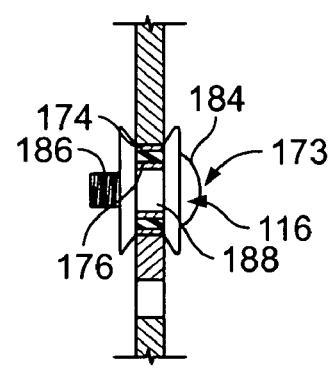
FIG. 7 is a vertical sectional view taken along lines 7—7 of FIG. 5 and showing another portion of the latching claw of the invention.

In the first embodiment, there is a somewhat slanted surface which limits the upward travel of the claw. FIG. 6 shows the rivet 142, and its position shows it engaging the latching claw 138, and this figure shows the relation of the spring 146 and the retainer holddown 148 as well as the retainer 154. FIG. 7 shows the fastener 173 in position with the elastomeric portion 174 of the wheel, and also shows the optional inner bearing sleeve 176. The fastener generally designated 116 is shown to have a head portion 184, a threaded portion 186 and the plain surface portion 188.

An important feature of the present form of device described herein is that it may be attached and detached from the motorcycle with very little effort, and yet when in position, is retained very securely. Also very importantly, the windscreen or other accessory may be mounted without the need for the user to hold or manipulate any levers or claws. The user need only place the shield in position and push it rearwardly in the case of installation, or pull it forward in the case of removal. The inclined surface portions and the transition surface portions cooperate to provide an easy entry into the curvilinear retainer portions, where the combination of the curvilinear retention surface and the biasing force on the claw retains the entire windshield in a snugly seated position.

The inclined surface and a transition surface both combined to allow the spools to be held snugly with the round shape of the spool trough being about the same as the curvilinear retention surface portions on the bracket and the claw. The optional rubber lying radically inside the trough portion permits tolerances to be taken up, and absorbs vibration during use. As pointed out, the wheels or spools may contain another form of flexible center sections. These include inclined spokes or a garter spring, preferably an inclined garter spring.

The vertical movement of the windshield during installation is very slight but the slot formation on the bottom of the bracket will easily helps account for such tolerances to be taken up.

Whereas two embodiments have been described wherein the shield or other accessory is placed on the cycle with a generally horizontal motion, it is possible, with suitable modifications, to provide an accessory with brackets and claws that act generally vertically instead of horizontally. Thus, with the appropriate form of openings and latching claws, the windshield or other accessory could be placed on, and removed from, the motorcycle with a generally vertical motion.

It will thus be seen that the present invention provides a novel windshield or other accessory mounting system having a number of advantages and characteristics including those pointed out herein and others which are inherent in the invention. It is anticipated that various changes may be made and that variations will occur to those skilled in the art, and that these changes and variations may be made without departing from this spirit of the invention of the scope of the appended claims.

The invention claimed is:

1. A readily removable accessory assembly for wheeled vehicles including motorcycles, motor driven cycles, motor scooters, ATCs and ATVs, comprising, in combination, an accessory member having a body portion, a pair of mounting brackets affixed to said accessory and two pairs of docking points fixed in relation to said vehicle, each pair comprising a first element and a second element, and each including axially inner and outer flanges surrounding a central trough, said brackets each including a first opening in a first part of said bracket, sized so as to snugly engage first element, and a second opening defined in part by an inclined entry surface and a curvilinear retention surface on said bracket and in part by a latching claw including a transition surface and a retention surface, said latching claw being fixed to said bracket so as to be movable between an open position wherein said trough may enter said second element freely and a closed position wherein said retention surface on said latching claw cooperates with said curvilinear surface on said mounting bracket to latch said second element snugly with respect to said bracket, said latching claw being thereby able to be pushed into a position of registry with said second element in a first direction and to be pulled from said docking point in a second direction, all without touching said latching claw.

2. A readily removable accessory as defined in claim 1 wherein said accessory is a windshield.

3. A readily removable accessory assembly as defined in claim 1 wherein said second element is a rotatable wheel.

4. A readily removable accessory assembly as defined in claim 1 wherein said first element is a rotatable wheel.

5. A readily removable accessory assembly as defined in claim 1 wherein said first and second elements are rotatable wheels.

6. A readily removable accessory assembly as defined in claim 1 wherein said retention surface on said latching claw has a downwardly facing, at least partially circular surface, and wherein said at least partially circular surface lies opposite said curvilinear retention surface on said bracket.

7. A readily removable accessory assembly as defined in claim 1 wherein said retention surface on said latching claw has an upwardly facing, at least partially circular surface, and wherein said at least partially circular surface lies opposite said curvilinear retention surface on said bracket.

8. A readily removable accessory as defined in claim 1 wherein said latching claw closes downwardly.

9. A readily removable accessory as defined in claim 1 wherein said latching claw closes upwardly.

10. A readily removable accessory as defined in claim 1 in which said latching claw contains a portion which is pivotally mounted on said bracket and an offset portion which contains said transition surface and said retention surface.

11. A readily removable accessory as defined in claim 3 wherein said rotatable wheel contains an elastomeric portion lying radially inwardly of said trough.

12. A readily removable accessory assembly as defined in claim 1 wherein said first openings are slots in said brackets.

13. A readily removable windshield assembly for wheeled vehicles including motorcycles, motor driven cycles, motor scooters, ATCs and ATVS, comprising, in combination, a shield member having at least a portion able to be seen through, a pair of mounting brackets affixed to said shield, two pairs of docking points fixed in relation to said vehicle, each pair having a lower element and an upper element in the shape of a wheel with axial flanges and a center trough and a radially inner stiff but flexible portion, said brackets each including a first slot adjacent the bottom margin of said bracket sized so as to snugly engage said lower element and a second opening in said bracket including an inclined entry surface and a curvilinear retention surface portion for cooperation with a latching claw assembly mounted for movement and also having a transition surface portion and a curvilinear retention surface, said latching claw assembly including means biasing said latching claw to a closed position, whereby said brackets snugly and said latch around said wheels to move into a position of registry removably latch said wheels in place without manipulating said latching claws.

14. A readily removable windshield assembly as defined in claim 13 wherein said lower element is in the shape of a wheel with axial flanges and a center trough.

15. A windshield assembly as defined in claim 13 wherein each of said latching claws has a curvilinear retention portion lying at least partially above said upper docking points.

16. A windshield assembly as defined in claim 13 wherein each of said latching claws has a curvilinear retention portion lying at least partially above said upper docking points.

17. A windshield assembly as defined in claim 13 wherein said radially stiff but flexible portion of said wheel comprises a section made from a urethane elastomer.

* * * * *